(12) United States Patent
Sugita

(10) Patent No.: US 12,400,351 B2
(45) Date of Patent: Aug. 26, 2025

(54) WORKPIECE IMAGE ANALYZING DEVICE, WORKPIECE IMAGE ANALYZING METHOD, AND PROGRAM

(71) Applicant: FANUC CORPORATION, Yamanashi (JP)

(72) Inventor: Yuuki Sugita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 536 days.

(21) Appl. No.: 17/789,673

(22) PCT Filed: Jan. 6, 2021

(86) PCT No.: PCT/JP2021/000228
§ 371 (c)(1),
(2) Date: Jun. 28, 2022

(87) PCT Pub. No.: WO2021/141051
PCT Pub. Date: Jul. 15, 2021

(65) Prior Publication Data
US 2023/0066200 A1 Mar. 2, 2023

(30) Foreign Application Priority Data

Jan. 9, 2020 (JP) .................................. 2020-001837
Dec. 15, 2020 (JP) .................................. 2020-207340

(51) Int. Cl.
*G06T 7/62* (2017.01)
*G06T 7/00* (2017.01)

(52) U.S. Cl.
CPC .............. *G06T 7/62* (2017.01); *G06T 7/0004* (2013.01); *G06T 2207/30164* (2013.01)

(58) Field of Classification Search
CPC .................. G06T 7/62; G06T 7/0004; G06T 2207/30164; G06T 7/60; G06T 2207/20092; B23Q 17/249
See application file for complete search history.

(56) References Cited

U.S. PATENT DOCUMENTS 11,103,216 B2 * 8/2021 Bercoff .................. A61B 8/485
12,282,730 B2 * 4/2025 Nakamura ........... G06V 10/764
(Continued)

FOREIGN PATENT DOCUMENTS

CN 110376961 10/2019
JP 2014-10103 1/2014
(Continued)

OTHER PUBLICATIONS

International Search Report issued Mar. 16, 2021 in corresponding International Application No. PCT/JP2021/000228.

*Primary Examiner* — Mia M Thomas
(74) *Attorney, Agent, or Firm* — Wenderoth, Lind & Ponack, L.L.P.

(57) ABSTRACT

A workpiece image analyzing device is provided with: a display unit for displaying an image of a workpiece to be processed by an industrial machine; an analysis object designating unit for accepting designation of an analysis object with respect to the image of the workpiece; a feature extracting unit for extracting, in a real-world coordinate system, structural features of the analysis object designated by the analysis object designating unit; an analysis item setting unit for accepting designation of an analysis item with respect to the image of the workpiece; and a physical quantity calculating unit which extracts, from the structural features of the analysis object, a feature required for calculating a physical quantity pertaining to the analysis item (Continued)

designated by the analysis item setting unit, and calculates the physical quantity using the extracted feature.

6 Claims, 11 Drawing Sheets

(56) References Cited

U.S. PATENT DOCUMENTS

| | | | |
|---|---|---|---|
| 2017/0148153 A1* | 5/2017 | Nakao | G06T 7/0004 |
| 2018/0260669 A1* | 9/2018 | Konishi | G06T 1/0014 |
| 2021/0192712 A1* | 6/2021 | Maeso | G06F 18/2431 |
| 2021/0374403 A1* | 12/2021 | Yumiba | G06V 10/7715 |
| 2022/0005223 A1* | 1/2022 | Yamashita | G06T 19/20 |
| 2023/0274411 A1* | 8/2023 | Zhou | G06V 10/20 |
| | | | 382/141 |
| 2024/0126265 A1* | 4/2024 | Ebrahimi Afrouzi | |
| | | | A47L 9/0686 |
| 2024/0185543 A1* | 6/2024 | Kajita | G06V 10/44 |
| 2024/0362892 A1* | 10/2024 | Komatsu | G06V 10/44 |

FOREIGN PATENT DOCUMENTS

| | | | | |
|---|---|---|---|---|
| JP | 2018-4497 | | 1/2018 | |
| JP | 2018-18155 | | 2/2018 | |
| WO | WO-2021141051 A1 * | 7/2021 | | G06T 7/0004 |

\* cited by examiner

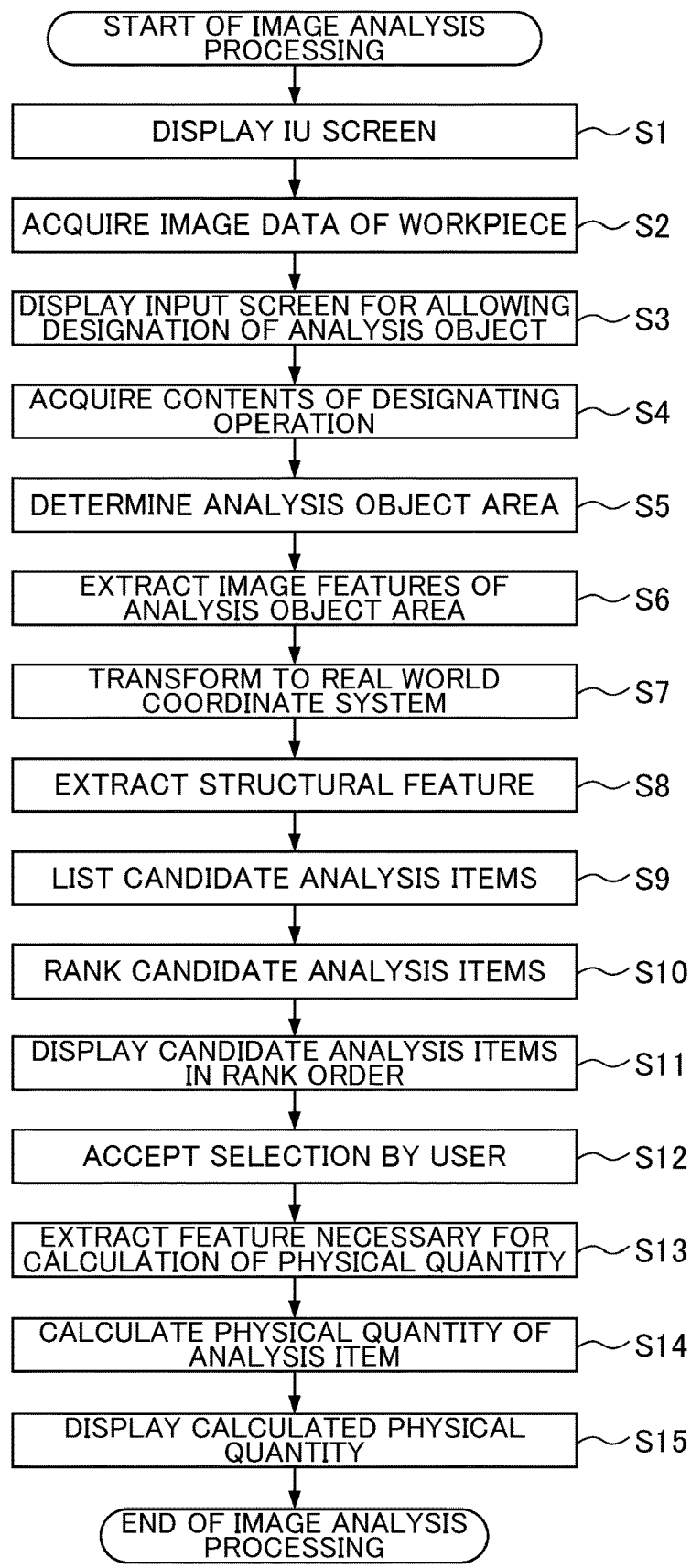

WORKPIECE IMAGE ANALYZING DEVICE, WORKPIECE IMAGE ANALYZING METHOD, AND PROGRAM

TECHNICAL FIELD

The present invention relates to a workpiece image analyzing device, a workpiece image analyzing method, and a program.

BACKGROUND ART

There are known techniques for measuring a workpiece as a machining object in order to, for example, machine the workpiece by means of a machine tool.

A workpiece can be measured by a measurement process using a touch sensor (touch probe) and a laser sensor. In general, this measurement process has an advantage that a high resolution and a high accuracy are achieved, but has a disadvantage that the area that can be measured at one time is small and the measurement takes a long time. Furthermore, for example, in a case where a workpiece is measured with a touch sensor, an operator manually moves the touch sensor while avoiding damage to the workpiece and the touch sensor, which requires a large workload for the operator.

A known system for reducing this workload is configured to automatically generate a measurement program according to which a touch sensor is moved, in response to input of the coordinates of a measurement point and an approach point. However, it still requires a large workload for the operator to grasp and input the coordinates of such plural points in consideration of the coordinate system.

On the other hand, there is a process for measuring the shape, position, etc. of a workpiece using an image captured by, for example, a visual sensor. In general, this process has an advantage that a large area can be measured in a short time, but has a disadvantage in terms of measurement resolution and repeatability. Therefore, the process is not practical for use in machining setup, such as setting of a workpiece coordinate system.

To address these problems, a workpiece measurement method has been devised by combining a process using a touch sensor or a laser sensor and a process based on a workpiece image. This method complements the disadvantages of the processes.

For example, a known method includes displaying a workpiece image captured by a visual sensor on a display, allowing a user to designate a measurement point and an approach point on the image by touch operation, and generating an automatic measurement program for moving a touch probe, based on the coordinates of the designated points. See, for example, Patent Document 1.

Patent Document 1: Japanese Unexamined Patent Application, Publication No. 2018-018155

DISCLOSURE OF THE INVENTION

Problems to be Solved by the Invention

The technique disclosed in Patent Document 1 may require knowledge and experience in relation to setting of measurement points, approach points, etc., and further, complicated procedures for setting a large number of measurement points, approach points, directions, etc., depending on the measurement object. Accordingly, a technique allowing an operator to intuitively designate a measurement object by way of fewer operation steps would contribute to greater convenience.

Under the foregoing circumstances, it is desired to reduce the workload required for measurement of a workpiece.

Means for Solving the Problems (1) An aspect of the present disclosure is directed to a workpiece image analyzing device including: a display unit that displays an image of a workpiece as a machining object of an industrial machine; an analysis object designating unit that accepts designation of an analysis object, the designation being provided with respect to the image of the workpiece; a feature extracting unit that extracts a structural feature of the analysis object designated by the analysis object designating unit, in a real-world coordinate system; an analysis item setting unit that accepts designation of an analysis item, the designation being provided with respect to the image of the workpiece; and a physical quantity calculating unit that extracts, from the structural feature of the analysis object, a feature necessary for calculation of a physical quantity of the analysis item designated by the analysis item setting unit, and calculates the physical quantity based on the extracted feature.

(2) An aspect of the present disclosure is directed to a workpiece image analyzing method including: a displaying step including displaying an image of a workpiece as a machining object of an industrial machine; an analysis object designating step including accepting designation of an analysis object, the designation being provided with respect to the image of the workpiece; a feature extracting step including extracting a structural feature of the analysis object designated in the analysis object designating step, in a real-world coordinate system; an analysis item setting step including accepting designation of an analysis item, the designation being provided with respect to the image of the workpiece; and a physical quantity calculating step including extracting, from the structural feature of the analysis object, a feature necessary for calculation of a physical quantity of the analysis item designated in the analysis item setting step, and including calculating the physical quantity based on the extracted feature.

(3) An aspect of the present disclosure is directed to a program for causing a computer to perform functions that include: a display control function including displaying an image of a workpiece as a machining object of an industrial machine; an analysis object designating function including accepting designation of an analysis object, the designation being provided with respect to the image of the workpiece; a feature extraction function including extracting a structural feature of the analysis object designated by the analysis object designating function, in a real-world coordinate system; an analysis item setting function including accepting designation of an analysis item, the designation being provided with respect to the image of the workpiece; and a physical quantity calculating function including extracting, from the structural feature of the analysis object, a feature necessary for calculation of a physical quantity of the analysis item designated by the analysis item setting function, and including calculating the physical quantity based on the extracted feature.

Effects of the Invention

The aspects of the present disclosure make it possible to reduce the workload required for measurement of a workpiece.

BRIEF DESCRIPTION OF THE DRAWINGS

FIG. 22 is a flowchart for explaining image analysis processing performed by the workpiece image analyzing device.

PREFERRED MODE FOR CARRYING OUT THE INVENTION

An embodiment will be described below with reference to the drawings.

One Embodiment

Figure 1:
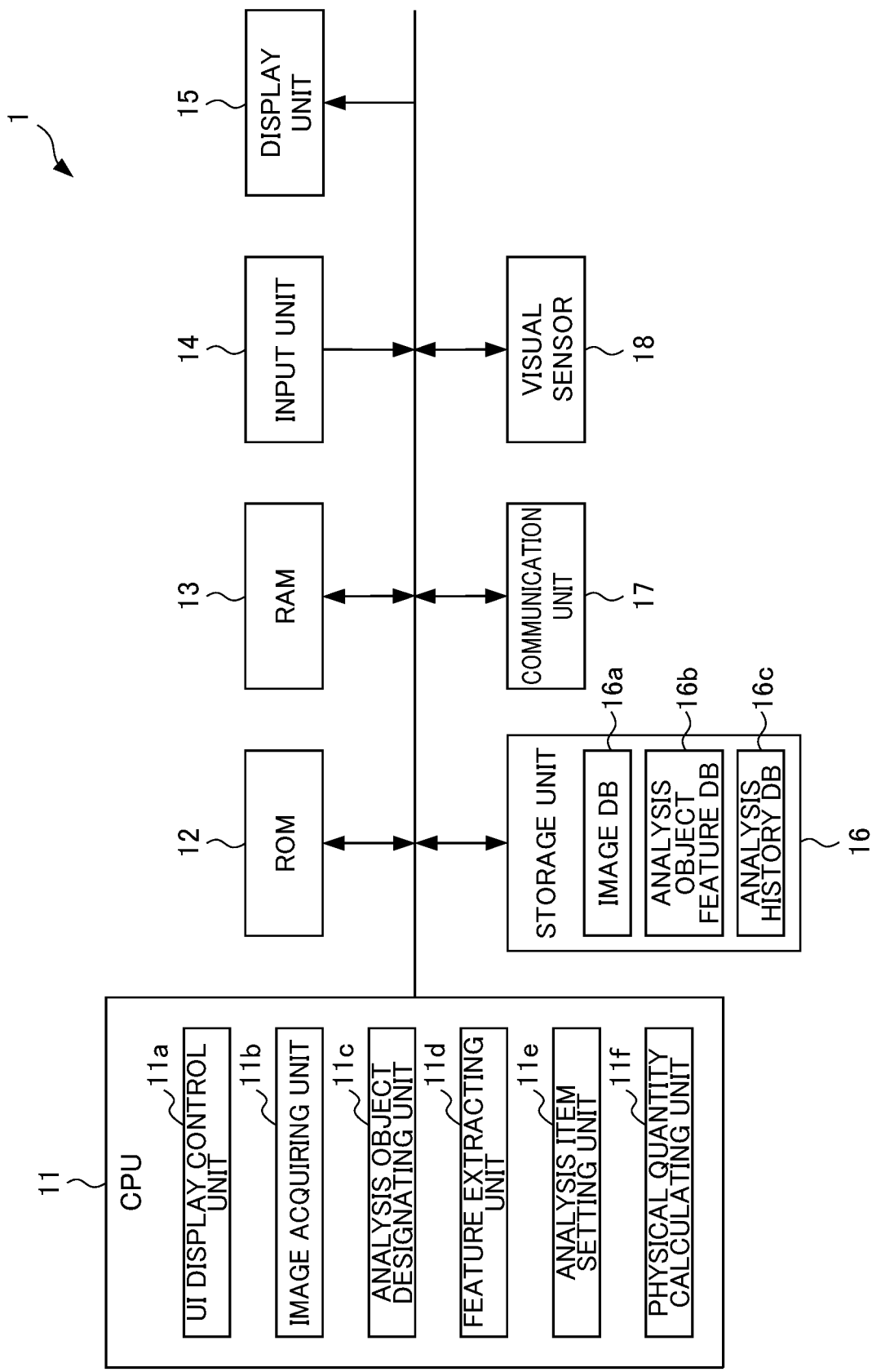
FIG. 1 is a block diagram illustrating a configuration of a workpiece image analyzing device according to an embodiment.

FIG. 1 is a block diagram illustrating a configuration of a workpiece image analyzing device 1 according to the present embodiment.

The workpiece image analyzing device 1 is constituted by an information processer, such as a numerical controller or a personal computer (PC).

As illustrated in FIG. 1, the workpiece image analyzing device 1 includes a central processing unit (CPU) 11, a ROM 12, a RAM 13, an input unit 14, a display unit 15, a storage unit 16, a communication unit 17, and a visual sensor 18.

The ROM 12 has various system programs written thereon in advance. The system programs are for controlling the workpiece image analyzing device 1, and are executed by the CPU 11 to be described later.

The RAM 13 is constituted by semiconductor memory such as dynamic random access memory (DRAM), and stores data generated when the CPU 11 to be described later executes various types of processing.

The input unit 14 is constituted by an input device such as a keyboard and a mouse, or a touch sensor (touch panel), and accepts various items of information that a user inputs to the workpiece image analyzing device 1.

The display unit 15 is constituted by a display device such as a liquid crystal display (LCD), and displays results of various type of processing performed by the workpiece image analyzing device 1.

The storage unit 16 is constituted by a non-volatile storage device such as a hard disk or a flash memory, and stores programs for image analysis, etc. The storage unit 16 further includes an image database (image DB) 16a that stores image data captured by the visual sensor 18 to be described later, an analysis object features database (analysis object feature DB) 16b that stores features of analysis objects, and an analysis history database (analysis history DB) 16c that stores a past analysis history. The storage unit 16 may further store results of various types of processing performed by the workpiece image analyzing device 1.

The communication unit 17 incudes a communication interface, such as a wired or wireless LAN or a USB, that performs signal processing based on a predetermined communication standard, and controls communication performed by the workpiece image analyzing device 1 with other devices.

The visual sensor 18 includes an imaging device for capturing 3D images, such as a depth camera or a stereo camera, and captures a 3D image of the workpiece to be analyzed. The captured 3D image is an RGBD image (point group data) containing an RGB image and a distance image D.

The CPU 11 controls the overall workpiece image analyzing device 1 by executing the various programs stored in the storage unit 16. For example, as will be described later, the CPU 11 executes a calculation program to calculate physical quantities such as a length, a height, a diameter, etc. of various structures of a workpiece as commanded by a user.

When executing the calculation program, the CPU 11 forms therein a functional configuration including a UI display control unit 11a, an image acquisition unit 11b, an analysis object designating unit 11c, a feature extracting unit 11d, an analysis item setting unit 11e, and a physical quantity calculating unit 11f.

<UI Display Control Unit 11a>

The UI display control unit 11a displays a user interface screen (UI screen) for the user to input and output various pieces of information during the physical quantity calculation processing.

For example, as will be described later, the UI display control unit 11a displays: an input screen for accepting instructions to acquire an image of a workpiece to be machined by a machine tool (not shown); an input screen for allowing an analysis object to be designated on an acquired image of the workpiece; an input screen for accepting a selection of an analysis item from among candidate analysis items; and results of an analysis of the designated analysis object.

The UI display control unit 11a can accept input that is implemented by way of, for example, a mouse, a keyboard, or a touch operation. For example, in addition to various forms of input via the touch operation, it is possible to draw an enclosure line with the directional keys of the keyboard, to draw a rectangular range by dragging the mouse, and to draw a dot by using the enter key of the keyboard or by clicking the mouse.

The workpiece is not limited to an object to be machined by a machine tool (not shown), but may be an object to be machined by industrial machines such as an industrial robot and a service robot.

<Image Acquisition Unit 11b>

The image acquisition unit 11b acquires image data of the workpiece, containing a three-dimensional shape of the workpiece. The image data may be captured by the visual sensor 18 (e.g., a depth camera or a stereo camera) or CAD data of the workpiece generated by a CAD (computer aided design) system. The image data of the workpiece acquired by the image acquisition unit 11b is stored in the storage unit 16 (image DB 16a).

<Analysis Object Designating Unit 11c>

The analysis object designating unit 11c acquires contents of a designating operation that the user inputs via an input screen for designation of an analysis object, the input screen being displayed on the UI screen by the UI display control unit 11a.

FIGS. 2 to 6 are schematic diagrams each illustrating an example of operations that the user performs on the input screen for designation of an analysis object.

Figure 2:
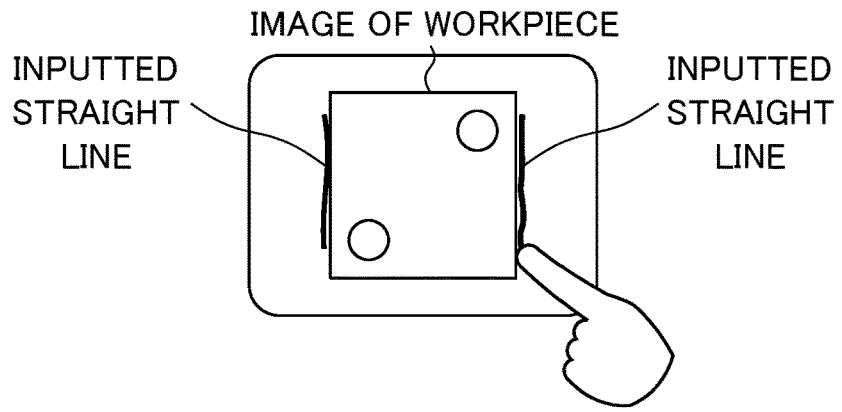
FIG. 2 is a schematic diagram illustrating an example of an operation performed on an input screen for designation of an analysis object.

In the example illustrated in FIG. 2, the user inputs, with respect to the image of the workpiece to be analyzed, a straight line along each of the right and left sides of image of the workpiece. The straight lines constitute the contents of the designating operation inputted by the user. In the case of the example illustrated in FIG. 2, the feature extracting unit 11d to be described later determines that the user intends to analyze the width of the workpiece.

Figure 3:
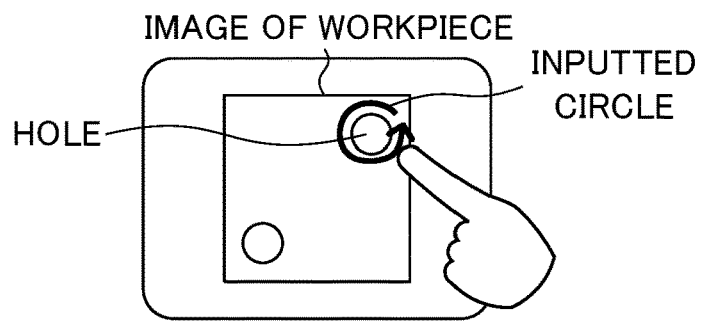
FIG. 3 is schematic diagram illustrating an example of an operation performed on an input screen for designation of an analysis object.

In the example illustrated in FIG. 3, the user inputs, with respect to the image of the workpiece to be analyzed, a circle surrounding a hole formed in the workpiece. The circle constitutes the contents of the designating operation inputted by the user. In the case of the example illustrated in FIG. 3, the feature extracting unit 11d to be described later determines that the user intends to analyze the inside diameter of the hole in the workpiece.

Figure 4:
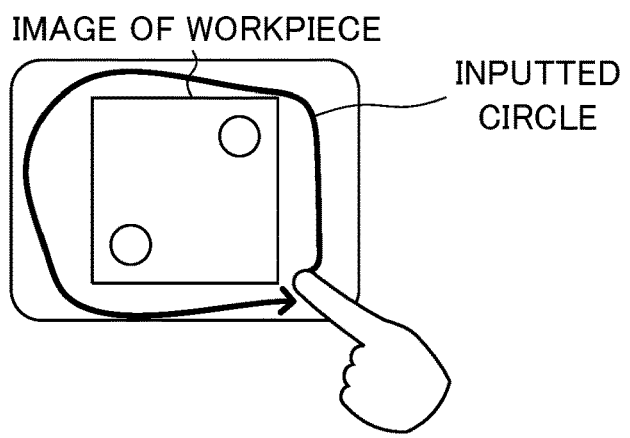
FIG. 4 is a schematic diagram illustrating an example of an operation performed on an input screen for designation of an analysis object.

In the example illustrated in FIG. 4, the user inputs, with respect to the image of the workpiece to be analyzed, a circle surrounding the entire image of the workpiece. The circle constitutes the contents of the designating operation inputted by the user. In the case of the example illustrated in FIG. 4, the user intends centering (origin setting) of the workpiece, for example.

Figure 5:
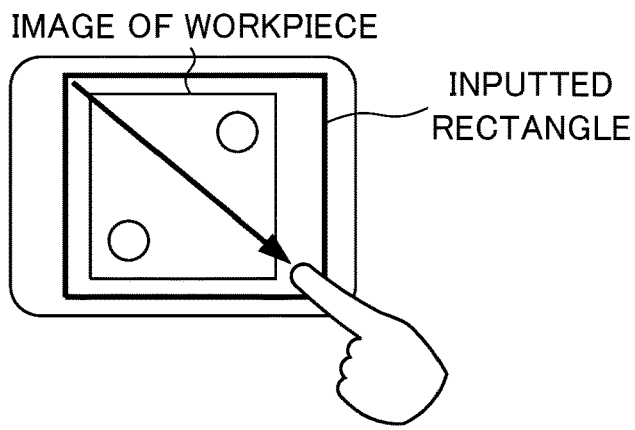
FIG. 5 is a schematic diagram illustrating an example of an operation performed on an input screen for designation of an analysis object.

In the example illustrated in FIG. 5, the user inputs, with respect to the image of the workpiece to be analyzed, a rectangle surrounding the entire image of the workpiece and specifies a diagonal line. In the case of the example illustrated in FIG. 5, the feature extracting unit 11d to be described later determines that the user intends centering (origin setting) of the workpiece.

Figure 6:
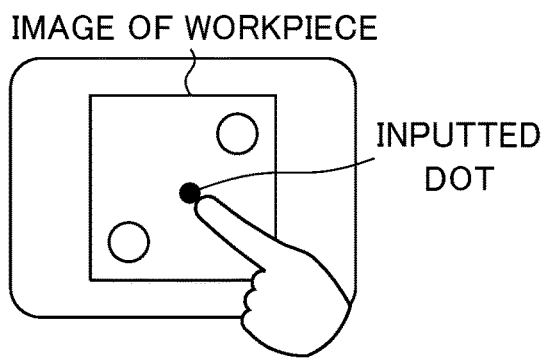
FIG. 6 is a schematic diagram illustrating an example of an operation performed on an input screen for designation of an analysis object.

In the example illustrated in FIG. 6, the user specifies, with respect to the image of the workpiece to be analyzed, a dot within a region of the workpiece. The dot constitutes the contents of the designating operation inputted by the user. In the case of the example illustrated in FIG. 6, the feature extracting unit 11d to be described later determines that the user intends centering (origin setting) of the workpiece.

In each of the examples illustrated in FIGS. 4 to 6, the feature extracting unit 11d to be described later extracts the contour of the workpiece. When the contour line forms a two-dimensional rectangle, the feature extracting unit 11d determines the center point of the workpiece by measuring the four sides and the four vertices.

<Feature Extracting Unit 11d>

The feature extracting unit 11d determines the analysis object in the image of the workpiece according to the designation of the analysis object acquired by the analysis object designating unit 11c, and extracts (detects) structural features (three-dimensional shape) of the determined analysis object. The feature extracting unit 11d then transforms the detected structural features to a real-world coordinate system (table coordinate system), based on the distance image D of the RGBD image and a transformation formula for a plane coordinate system (image coordinate system) of display and the table coordinate system.

Further, the feature extracting unit 11d stores data indicating the extracted structural features of the analysis object in the storage unit 16 (analysis object feature DB 16b).

Note that the above image coordinate system and a machine coordinate system are calibrated in advance and are associated with each other. The coordinate system of the camera may be used instead of the plane coordinate system (image coordinate system) of display.

FIGS. 7 to 11 are diagrams each illustrating an example of processing via which the feature extracting unit 11d extracts the structural features (three-dimensional shape), in response to the designating operation inputted by the user.

Figure 7:
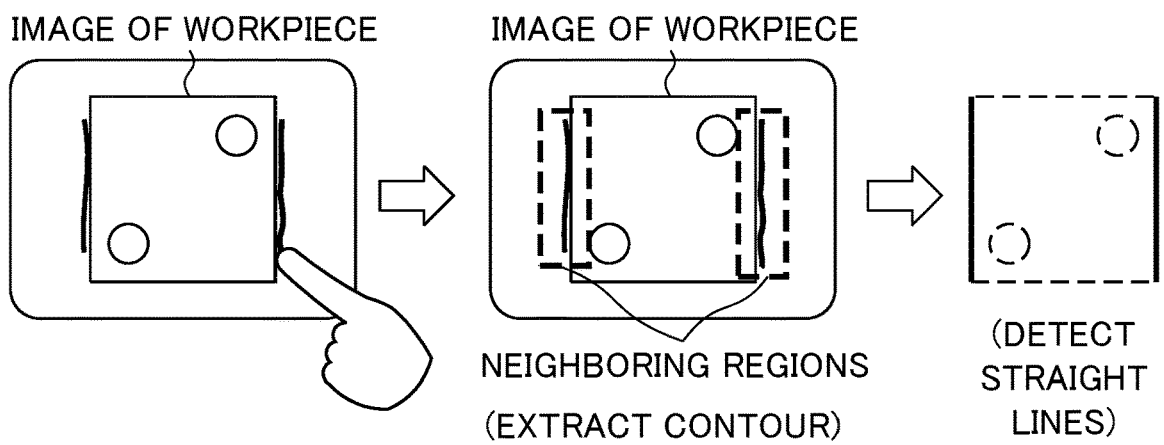
FIG. 7 is a schematic diagram illustrating an example of processing for extracting structural features (a three-dimensional shape) in response to a designating operation inputted by a user.

In the example illustrated in FIG. 7, the user inputs straight lines along the left and right sides of the image of the workpiece as in FIG. 2. The feature extracting unit 11d specifies a neighboring region of each of the segments (what have been inputted) and extracts contour lines from inside the neighboring regions by the Canny method. The feature extracting unit 11d then extracts two straight lines (the left and right outer edges of the workpiece) by the Hough transform. In the case of the contour lines extracted as in FIG. 7, the feature extracting unit 11d can determine, for the left contour line, that there is an object on the right of the left contour line, based on a distance image D showing that right-side pixels have convex values or based on a background difference that indicates the presence of an object on the right.

Figure 8:
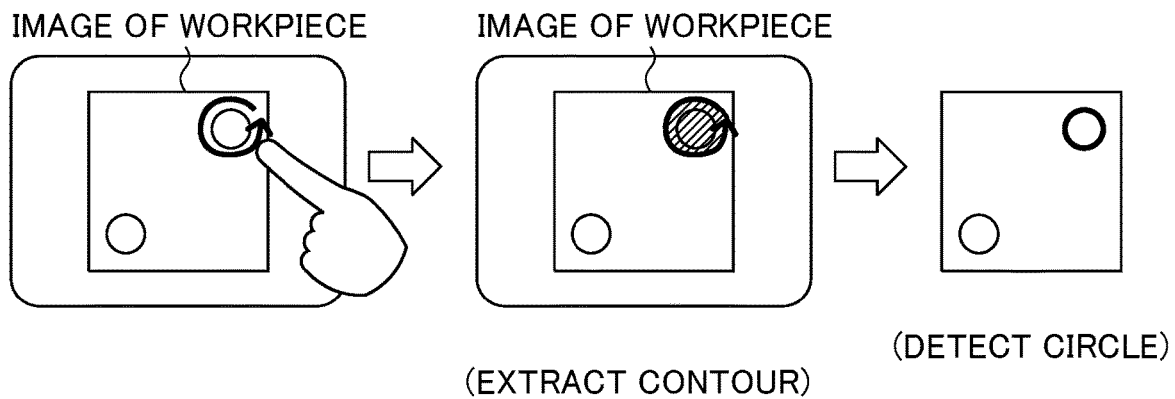
FIG. 8 is a schematic diagram illustrating an example of processing for extracting structural features (a three-dimensional shape) in response to a designating operation inputted by a user.

In the example illustrated in FIG. 8, the user inputs the circle surrounding a hole formed in the workpiece as in FIG. 3. The feature extracting unit 11d extracts a contour line from inside the circle surrounding the hole in the workpiece by the Snake method, and further, detects a circle (hole) from the extracted contour line by the Hough transform.

Figure 9:
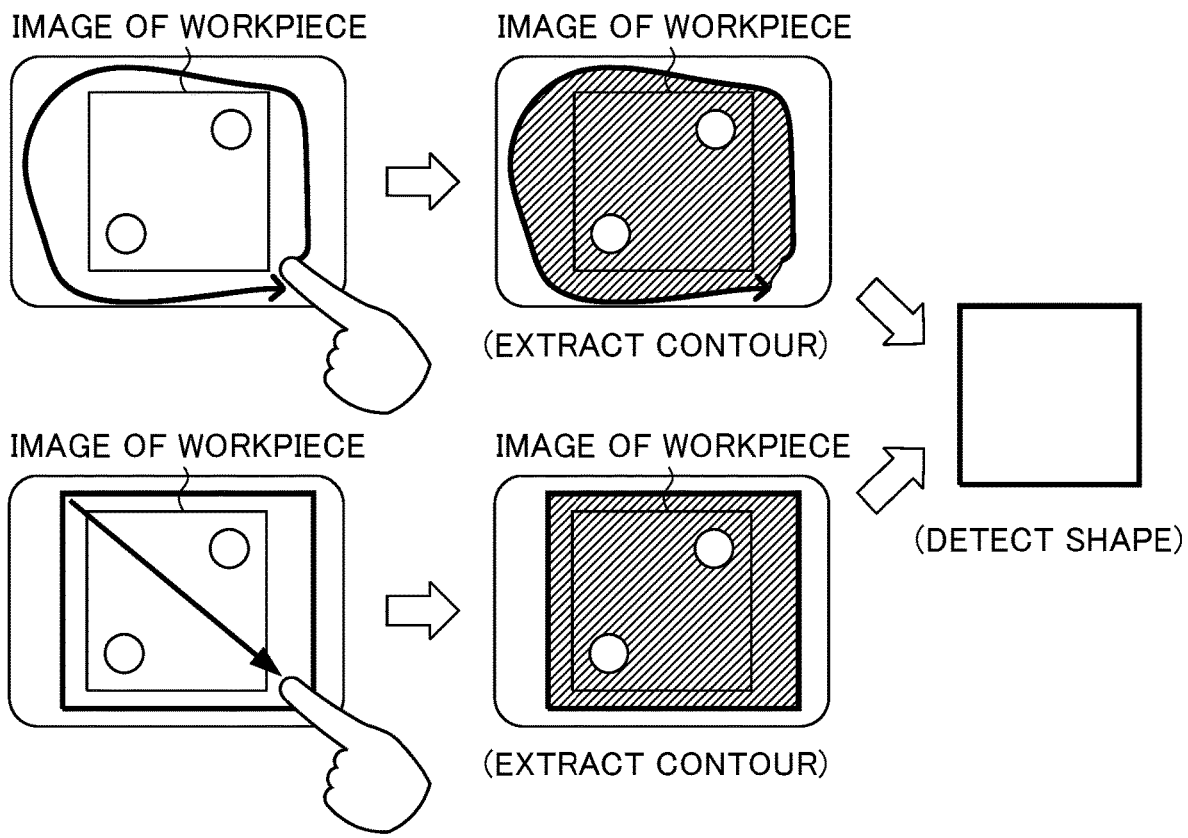
FIG. 9 is a schematic diagram illustrating an example of processing for extracting structural features (a three-dimensional shape) in response to a designating operation inputted by a user.

In the example illustrated in FIG. 9, the user inputs a circle or rectangle surrounding the entire image of the workpiece as in FIG. 4 or 5. The feature extracting unit 11d extracts a contour line from inside the circle or rectangle surrounding the entire image of the workpiece by the Snake method, detects four straight lines from the extracted contour line by the Hough transform, and detects a rectangle (the top, bottom, left, and right outer edges of the workpiece) based on the detected four lines.

Figure 10:
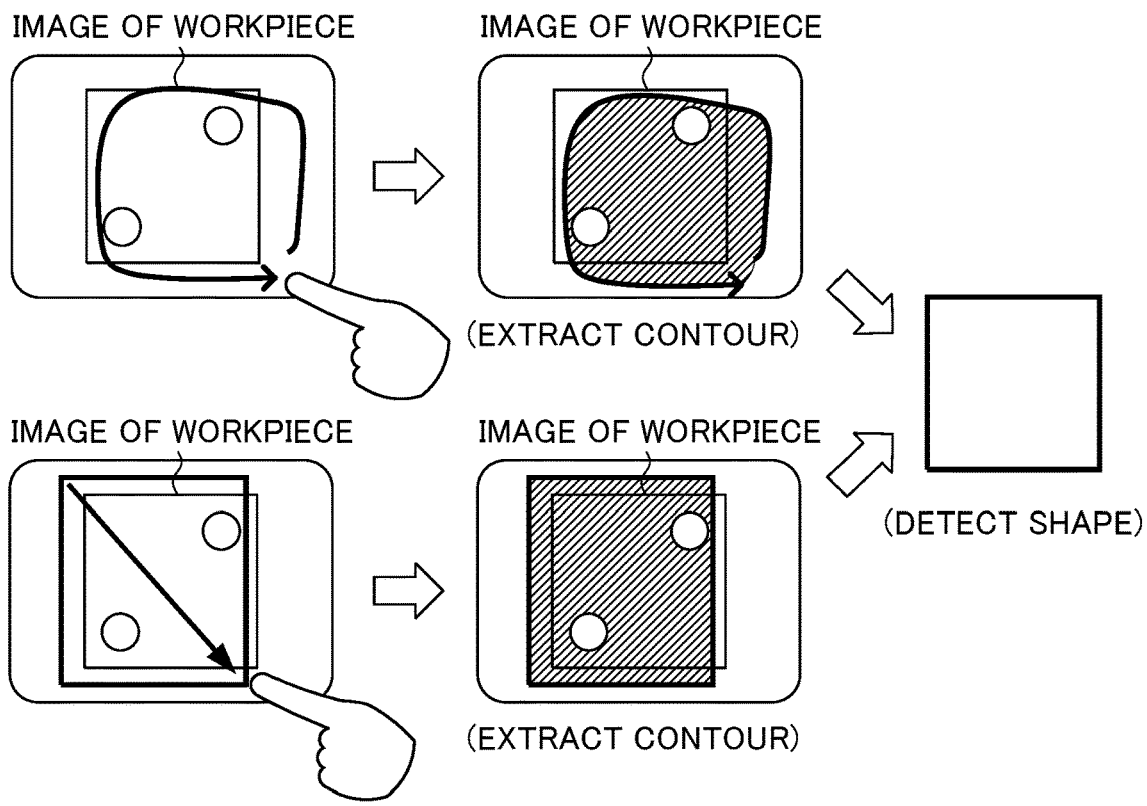
FIG. 10 is a schematic diagram illustrating an example of processing for extracting structural features (a three-dimensional shape) in response to a designating operation inputted by a user.

In the example of FIG. 9, the user inputs the circle or rectangle surrounding the entire image of the workpiece as illustrated in FIG. 4 or 5. However, as illustrated in FIG. 10, the user may input a circle or rectangle surrounding a portion of the image of the workpiece. In this case, if the feature extracting unit 11d cannot find a closed contour inside the enclosure line by the Snake method, it may use a region growing method to extract a region having the same or similar color to that of the inside of the enclosure line. In this way, the feature extracting unit 11d can detect, by the Hough transform, four straight lines from the extracted region, and detect a rectangle (the top, bottom, left, and right outer edges of the workpiece) based on the detected four lines.

Figure 11:
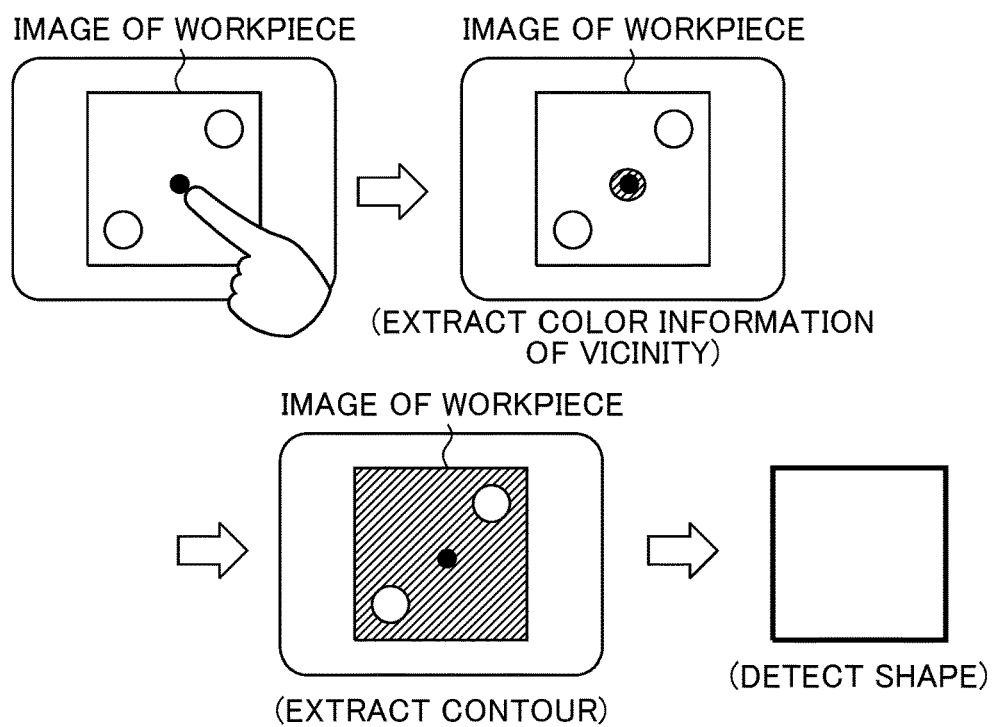
FIG. 11 is a schematic diagram illustrating an example of processing for extracting structural features (a three-dimensional shape) in response to a designating operation inputted by a user.

In the example illustrated in FIG. 11, the user designates a dot in the region of the workpiece as in FIG. 6. The feature extracting unit 11d extracts, from the dot designated in the region of the workpiece, color information of the vicinity of the designated dot, and extracts a region having a color close to that of the vicinity of the designated dot by the region growing method. The feature extracting unit 11d then extracts a contour line by the Snake method, detects four straight lines from the extracted contour line by the Hough transform, and detects a rectangle (the top, bottom, left, and right outer edges of the workpiece) based on the four detected straight lines.

In the examples described above, the structure is extracted by the two-step processing including: the step of extracting the contour by the Snake method or the Canny method, and the subsequent step of detecting circles and straight lines by the Hough transform. However, this is a non-limiting example. Since the contour extraction by the Snake method or the Canny method is performed as a preprocess for reducing false detections during the Hough transform, it may be omitted.

Figure 12:
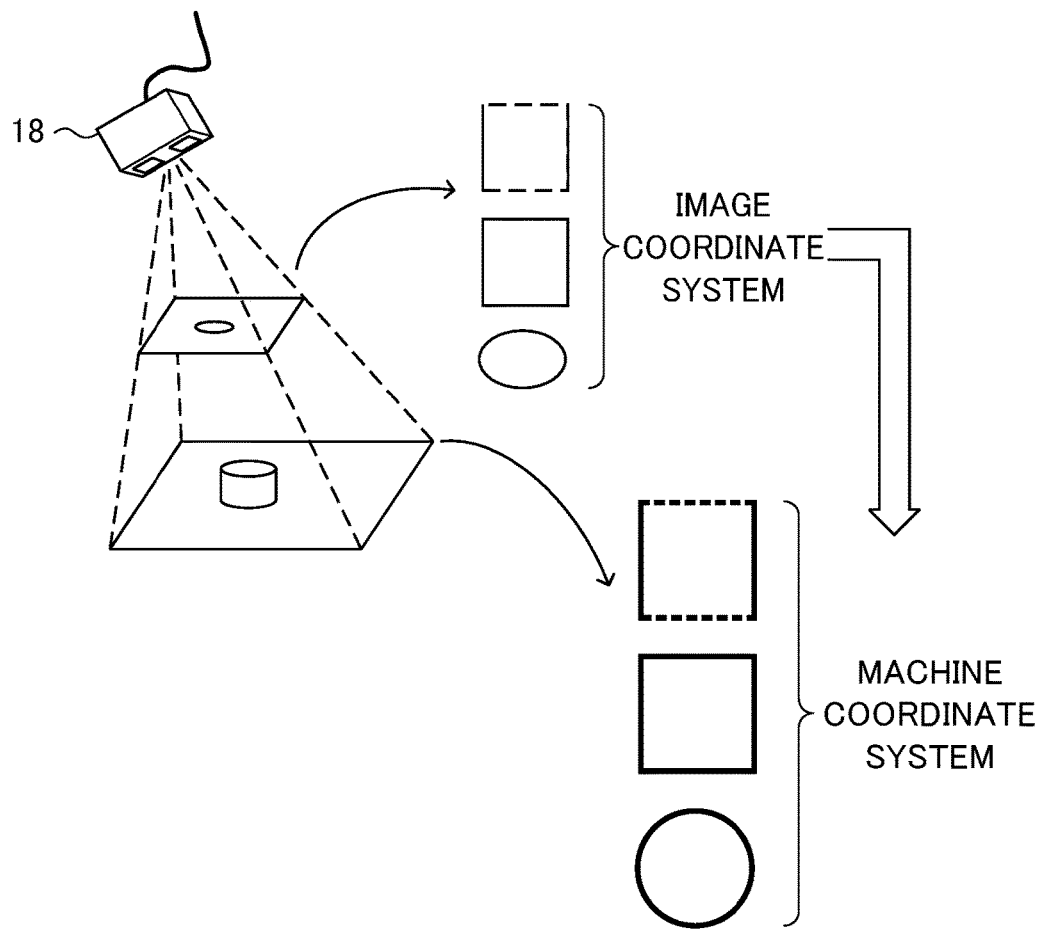
FIG. 12 is a schematic diagram illustrating an example of transformation from an image coordinate system to a machine coordinate system.

FIG. 12 is a schematic diagram illustrating an example of a transformation from an image coordinate system to a machine coordinate system.

As shown in FIG. 12, the feature extracting unit 11d transforms the image coordinates of the detected structural features of the analysis object (e.g., the left and right outer edges of the workpiece, the hole, the top, bottom, left, and right outer edges of the workpiece, etc.) to table coordinates (machine coordinates), which are coordinates in the real-world. In this way, the feature extracting unit 11d can acquire position information regarding the substantive three-dimensional shape of the analysis object designated by the user via the UI screen.

<Analysis Item Setting Unit 11e>

The analysis item setting unit 11e accepts designation of an analysis item for the image of the workpiece.

For example, the analysis item setting unit 11e sets analysis items to be analyzed for the structural features of the analysis object detected by the feature extracting unit 11d, by referring to a database (not shown) included in the storage unit 16 and containing the definitions of types of analysis items.

Specifically, the analysis item setting unit 11e refers to past analysis history information (the analysis history DB 16c) based on the structural features of the analysis object detected by the feature extracting unit 11d, and lists items (candidate analysis items) that can be selected as an analysis item.

Further, the analysis item setting unit 11e ranks the listed candidate analysis items. Specifically, the analysis item setting unit 11e ranks the listed candidate analysis items, with reference to the type, shape, machining status (to be machined, in process of machining, or machined) of a structure, the contents of a machining program, and the past analysis history. The candidate analysis items ranked by the analysis item setting unit 11e are displayed in rank order on the UI screen by the UI display control unit 11a, so that selection of an analysis item by the user is accepted.

The operation of the analysis item setting unit 11e will be described later.

<Physical Quantity Calculating Unit 11f>

The physical quantity calculating unit 11f extracts, from the structural features of the analysis object that have been detected by the feature extracting unit 11d, a feature necessary for calculation of the physical quantity of the analysis item designated by the analysis item setting unit 11e, and calculates the physical quantity based on the extracted feature.

The following describes the operation performed by the physical quantity calculating unit 11f in each of cases (A) to (C): (A) a cylindrical workpiece, (B) a rectangular parallelepiped workpiece with two holes, and (C) a circular columnar workpiece with a spherical surface.

(A) Cylindrical Workpiece

Figure 13:
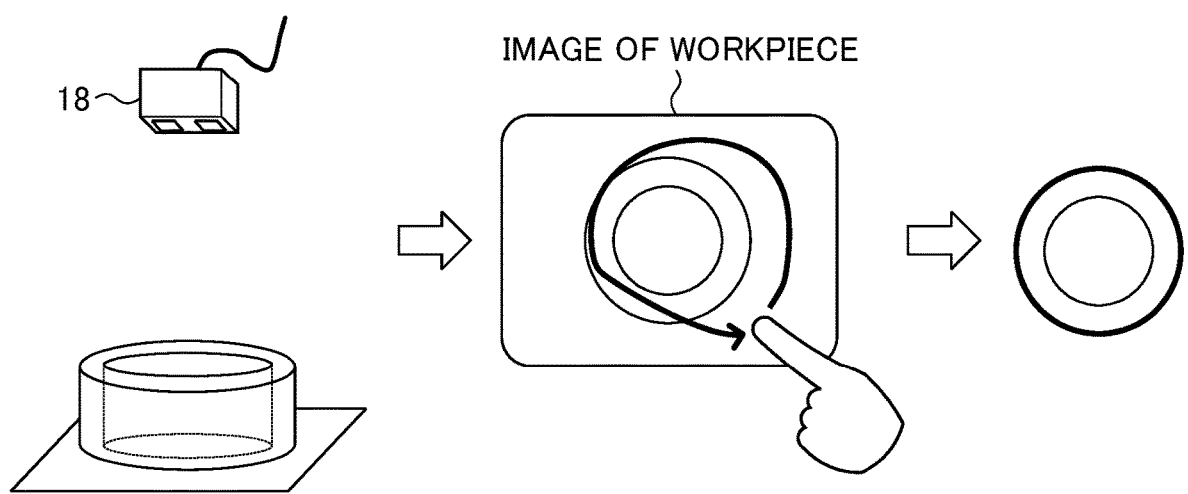
FIG. 13 is a schematic diagram illustrating an example of physical quantity calculation processing that is performed with respect to a cylindrical workpiece.
Figure 14:
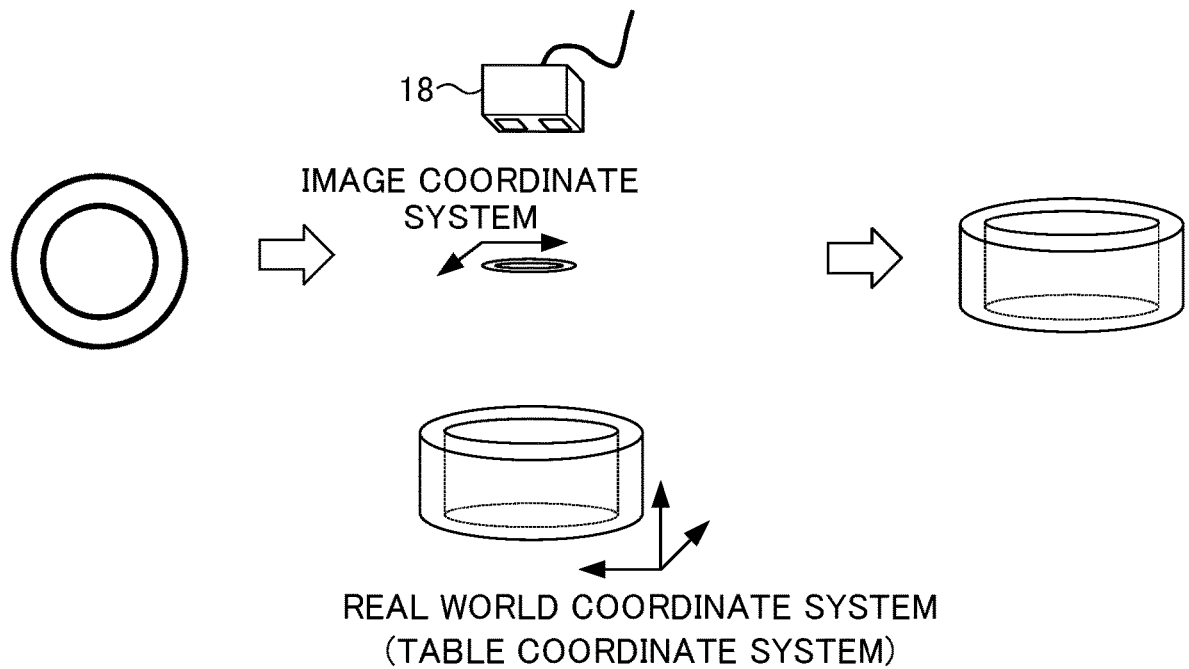
FIG. 14 is a schematic diagram illustrating an example of physical quantity calculation processing that is performed with respect to a cylindrical workpiece.

For example, as illustrated in FIG. 13, the visual sensor 18 as a 3D camera captures image data of the cylindrical workpiece, and the image acquisition unit 11b acquires the captured image data. The UI display control unit 11a displays the acquired RGB image on the UI screen. The user inputs, via the input unit 14, an enclosure line to designate an analysis object. The analysis object designating unit 11c acquires the inputted enclosure line. The feature extracting unit 11d then extracts, from the acquired enclosure line as the initial value, the contour line (indicated by the bold line) corresponding to the outer circumference of the cylinder, by the Snake method. Next, the feature extracting unit 11d defines, as an analysis object area, the contour line extracted by the Snake method and the inside of the contour line, and extracts all the image features (contour lines) in the analysis object area. In other words, as illustrated in FIG. 14, the feature extracting unit 11d can extract the two contour lines of the cylindrical workpiece, namely, the outer contour line and the inner contour line, which are indicated by bold lines.

In order to accurately measure the cylindrical workpiece, which is distorted in the image and is at a scale different from that in the real-world, the feature extracting unit 11d transforms points on the extracted contour lines to the real-world coordinate system (table coordinate system) based on the distance image D of the RGBD image and the transformation formula for the image coordinate system and the table coordinate system. The feature extracting unit 11d then performs detection of circles, straight lines, etc. from the contours transformed to the table coordinate system, and thereby can detect a structural feature in that the analysis object area is composed of two concentric circles.

The feature extracting unit 11d may narrow down the structural features of the analysis object by using additional information such as CAD data and a machining program. Alternatively, the user may designate on the UI screen.

The feature extracting unit 11d can further detect, from the distance image D, a structural feature in that the analysis object area protrudes in the Z direction relative to the surroundings (table).

Next, in response to the detection of the structural features of the cylindrical workpiece as the analysis object by the feature extracting unit 11d, the analysis item setting unit 11e searches the analysis history DB 16c of the storage unit 16, using as queries "machining status of workpiece" and the structural features of the analysis object that include "protuberance/concavity of analysis object area", "contour segments", and "relationship between contour segments". Specifically, the analysis item setting unit 11e searches the analysis history DB 16c using, as the queries, "machining status of workpiece: machined" and the structural features of the cylindrical workpiece, namely, "protuberance/concavity of analysis object area: protruding relative to the surroundings", "contour segments: circle×2", and "relationship between contour segments: concentric". For example, the analysis item setting unit 11e lists "outside diameter", "height", "inside diameter", "circumferential length", etc., as items (candidate analysis items) that can be selected as the analysis item.

Furthermore, the analysis item setting unit 11e accesses the analysis history DB 16c to refer to, for example, frequencies with which analysis items have actually been analyzed in relation to workpieces similar to the current analysis object, i.e., the cylindrical workpiece, and thereby ranks the listed candidate analysis items. Specifically, the analysis item setting unit 11e searches the analysis history DB 16c using the following queries: "machining status of workpiece: machined", "protuberance/concavity of analysis object area: protruding relative to the surroundings", "contour segments: circle×2", and "relationship between contour segments: concentric". For example, in a case where the past analysis history of the analysis objects similar to the cylindrical workpiece as the current analysis object shows that analysis of "outside diameter" constitutes 70%, analysis of "height" constitutes 15%, analysis of "inside diameter" constitutes 10%, analysis of "circumferential length" constitutes 5%, etc., the analysis item setting unit 11e sorts the candidate analysis items in descending order of likelihood of being selected, as follows: "outside diameter", "height", "inside diameter", and "circumferential length".

Figure 15:
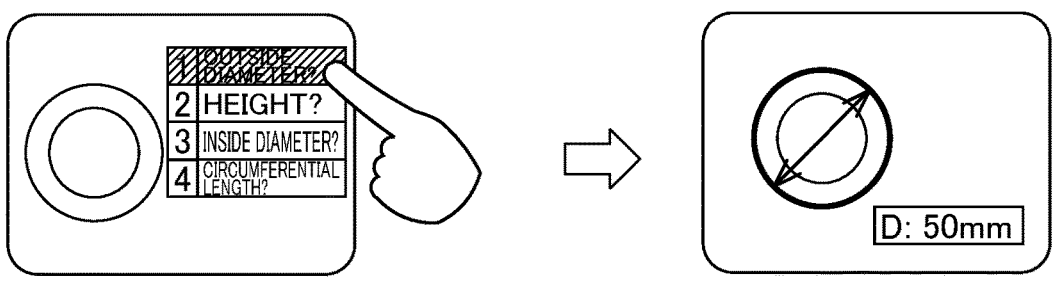
FIG. 15 is a schematic diagram illustrating an example of physical quantity calculation processing that is performed with respect to a cylindrical workpiece.

As illustrated in FIG. 15, the UI display control unit 11a displays, on the UI screen, the candidate analysis items sorted by the analysis item setting unit 11e in rank order. Selection by the user is then accepted.

For example, if the user selects "outside diameter" as the desired analysis item from the candidate analysis items, the physical quantity calculating unit 11f extracts the outer circular contour line as the feature necessary for calculating the physical quantity of the analysis item in order to calculate the outside diameter. The physical quantity calculating unit 11f calculates the diameter of the circle based on the coordinate values of points on the extracted circular contour line, using a known method such as the least-squares method. As illustrated in FIG. 15, the UI display control unit 11a may display, on the UI screen, the value of the diameter of the outer circle calculated by the physical quantity calculating unit 11f.

The outside diameter, etc. of the cylindrical workpiece may be calculated when the feature extracting unit 11d transforms the points on the contour lines extracted from the cylindrical workpiece to the table coordinate system.

(B) Rectangular Parallelepiped Workpiece with Two Holes

Figure 16:
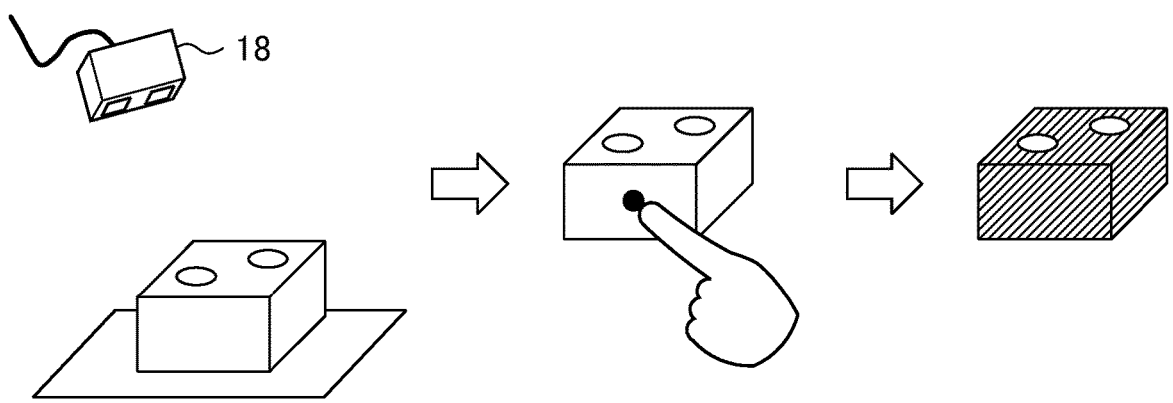
FIG. 16 is a schematic diagram illustrating an example of physical quantity calculation processing that is performed with respect to a rectangular parallelepiped workpiece with two holes.

As illustrated in FIG. 16, the visual sensor 18 as a 3D camera captures image data of the rectangular parallelepiped workpiece having two holes from obliquely above, and the image acquisition unit 11b acquires the captured image data.

Figure 17:
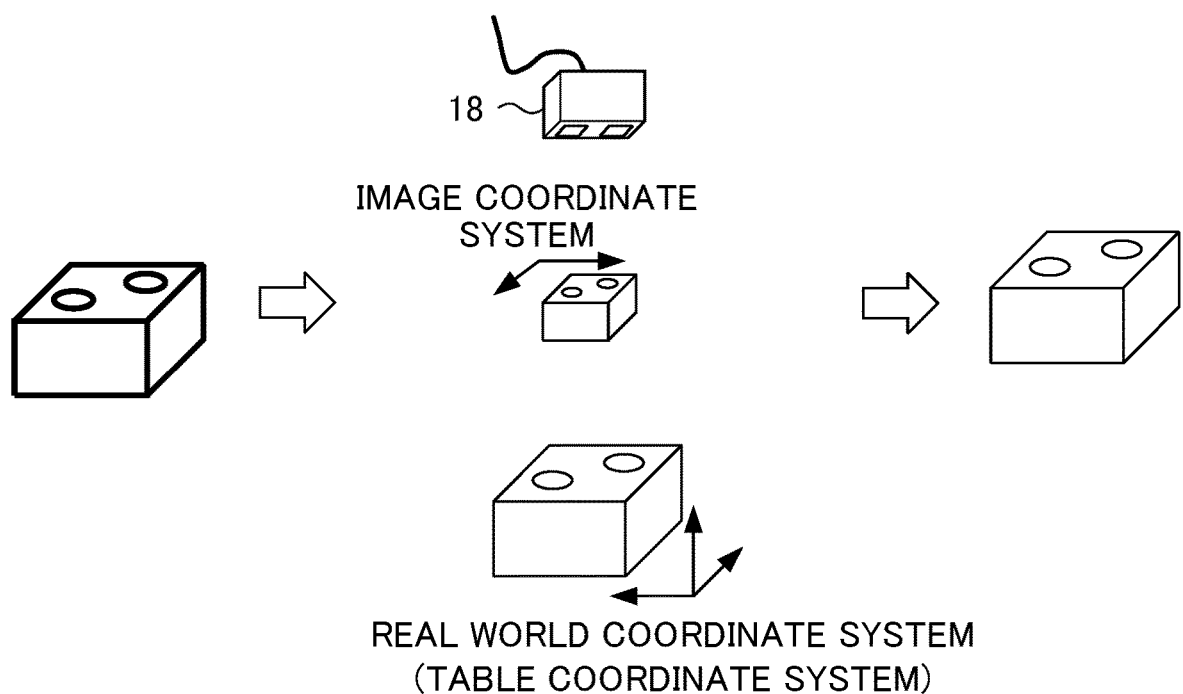
FIG. 17 is a schematic diagram illustrating an example of physical quantity calculation processing that is performed with respect to a rectangular parallelepiped workpiece with two holes.

The UI display control unit 11a displays the acquired RGB image on the UI screen. The user inputs, via the input unit 14, a dot to designate an analysis object as in the case illustrated in FIG. 6. The analysis object designating unit 11c acquires the inputted dot. The feature extracting unit 11d then determines, by the region growing method, an area having a luminance value equivalent to that of the vicinity of the acquired dot, and defines the region marked with shading as the analysis object area. Next, as illustrated in FIG. 17, the feature extracting unit 11d extracts all the image features (contours) indicated by bold lines in the analysis object area.

In order to accurately measure the rectangular parallelepiped workpiece with two holes, which is distorted in the image and is at a scale different from that in the real-world, the feature extracting unit 11d transforms points on the extracted contour lines to the real-world coordinate system (table coordinate system) based on the distance image D of the RGBD image and the transformation formula for the image coordinate system and the table coordinate system. The feature extracting unit 11d then performs detection of circles, straight lines, rectangular parallelepipeds, etc. from the contours transformed to the table coordinate system, and thereby can detect a structural feature in that the analysis object area is composed of nine contour lines that form part of a rectangular parallelepiped, and two circles. The feature extracting unit 11d can further detect, from the distance image D, a structural feature in that the analysis object area protrudes in the Z direction relative to the surroundings (table).

Next, in response to the detection of the structural features of the rectangular parallelepiped workpiece with two holes as the analysis object by the feature extracting unit 11d, the analysis item setting unit 11e searches the analysis history DB 16c of the storage unit 16, using as queries "machining status of workpiece" and the structural features of the analysis object that include "protuberance/concavity of analysis object area", "contour segments", and "relationship between contour segments". Specifically, the analysis item setting unit 11e searches the analysis history DB 16c using, as the queries, "machining status of workpiece: machined" and the structural features of the rectangular parallelepiped workpiece with two holes, namely, "protuberance/concavity of analysis object area: protruding relative to the surroundings", "contour segments: straight line×9 and circle×2", and "relationship between contour segments: rectangular parallelepiped". For example, the analysis item setting unit 11e lists "center of rectangular parallelepiped", "height of rectangular parallelepiped", "inside diameter of circle", etc., as items (candidate analysis items) that can be selected as the analysis item.

Furthermore, the analysis item setting unit 11e accesses the analysis history DB 16c to refer to, for example, frequencies with which analysis items have actually been analyzed in relation to workpieces similar to the current analysis object, i.e., the rectangular parallelepiped workpiece with two holes, and thereby ranks the listed candidate analysis items. Specifically, the analysis item setting unit 11e searches the analysis history DB 16c using the following queries: "machining status of workpiece: machined", "protuberance/concavity of analysis object area: protruding relative to the surroundings", "contour segments: straight line×9 and circle×2", and "relationship between contour segments: rectangular parallelepiped". For example, in a case where the past analysis history of the analysis objects similar to the rectangular parallelepiped workpiece with two holes as the current analysis object shows that analysis of "center of rectangular parallelepiped" constitutes 60%, analysis of "height of rectangular parallelepiped" constitutes 25%, analysis of "inside diameter of circle" constitutes 5%, etc., the analysis item setting unit 11e sorts the candidate analysis items in descending order of likelihood of being selected, as follows: "center of rectangular parallelepiped", "height of rectangular parallelepiped", and "inside diameter of circle".

Figure 18:
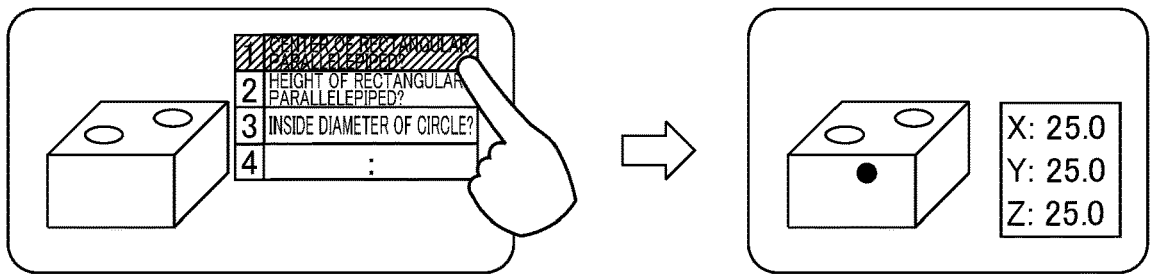
FIG. 18 is a schematic diagram illustrating an example of physical quantity calculation processing that is performed with respect to a rectangular parallelepiped workpiece with two holes.

As illustrated in FIG. 18, the UI display control unit 11a displays, on the UI screen, the candidate analysis items sorted by the analysis item setting unit 11e in rank order. Selection by the user is then accepted. The candidate analysis item in the first rank may be automatically set as the analysis item. Alternatively, a preset configuration is conceivable in which the candidate analysis items up to the Nth rank are determined as the analysis items (N is an integer of 2 or more).

For example, if the user selects "center of rectangular parallelepiped" as the desired analysis item from the candidate analysis items, the physical quantity calculating unit 11f extracts the nine straight contour lines as the feature necessary for calculating the physical quantity of the analysis item in order to calculate the coordinates of the center of the rectangular parallelepiped. The physical quantity calculating unit 11f calculates the midpoint of each of three faces of the rectangular parallelepiped, based on the associated four lines from among the extracted straight contour lines. The physical quantity calculating unit 11f calculates the coordinates of the center of the rectangular parallelepiped, from the calculated midpoints of the three faces of the rectangular parallelepiped. As illustrated in FIG. 18, the UI display control unit 11a may display, on the UI screen, the coordinates of the center of the rectangular parallelepiped calculated by the physical quantity calculating unit 11f.

The coordinates of the center, etc. of the rectangular parallelepiped workpiece with two holes may be calculated when the feature extracting unit 11d transforms the points on the contour lines extracted from the rectangular parallelepiped workpiece with two holes to the table coordinate system.

(C) Circular Columnar Workpiece with Spherical Surface

Figure 19:
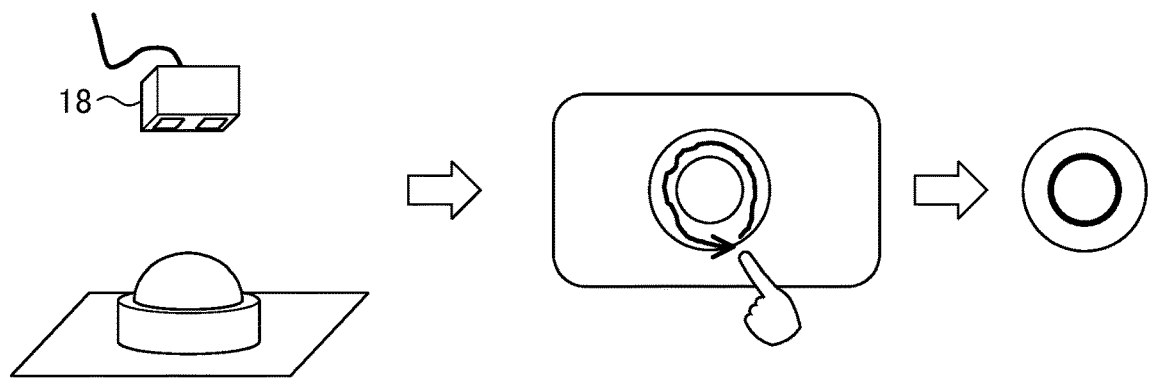
FIG. 19 is a schematic diagram illustrating an example of physical quantity calculation processing that is performed with respect to a circular columnar workpiece with a spherical surface.
Figure 20:
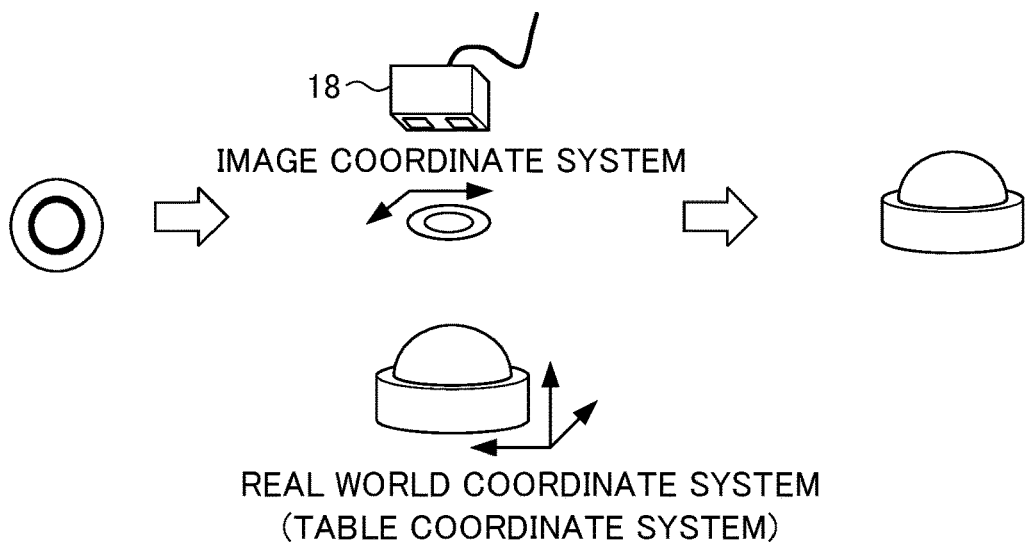
FIG. 20 is a schematic diagram illustrating an example of physical quantity calculation processing that is performed with respect to a circular columnar workpiece with a spherical surface.

As illustrated in FIG. 19, the visual sensor 18 as a 3D camera captures image data of the circular columnar workpiece with a spherical surface from vertically above, and the image acquisition unit 11b acquires the captured image data. The UI display control unit 11a displays the acquired RGB image on the UI screen. The user inputs, via the input unit 14, an enclosure line to designate an analysis object. The analysis object designating unit 11c acquires the inputted enclosure line. The feature extracting unit 11d then extracts, from the acquired enclosure line as the initial value, the contour line (indicated by the bold line) of the hemispherical part, by the Snake method. Next, the feature extracting unit 11d defines, as an analysis object area, the contour line extracted by the Snake method and the inside of the contour line, and extracts image features (the contour and image coordinate values of pixels) in the analysis object area.

The feature extracting unit 11d transforms the extracted image coordinate values of the pixels to the real-world coordinate system (table coordinate system) based on the distance image D of the RGBD image and the transformation formula for the image coordinate system and the table coordinate system. The feature extracting unit 11d then performs detection of circles, etc. from the contour line transformed to the table coordinate system, and thereby can detect a structural feature in that the analysis object area is composed of one circle (i.e., one continuous plane).

Furthermore, the feature extracting unit 11d performs detection of spheres from the extracted point group (pixels transformed into the table coordinate system), and thereby can detect a structural feature in that the analysis object area is a spherical surface. The feature extracting unit 11d can further detect, from the distance image D, a structural feature in that the analysis object area protrudes in the Z direction relative to the surroundings (table).

The feature extracting unit 11d may narrow down the structural features of the analysis object by using additional information such as CAD data and a machining program. Alternatively, the user may designate a structural feature on the UI screen.

Next, in response to the detection of the structural features of the circular columnar workpiece with a spherical surface as the analysis object by the feature extracting unit 11d, the analysis item setting unit 11e searches the analysis history DB 16c of the storage unit 16, using as queries "machining status of workpiece" and the structural features of the workpiece that include "protuberance/concavity of analysis object area", "surface segments", and "relationship between surface segments". Specifically, the analysis item setting unit 11e searches the analysis history DB 16c using, as the queries, "machining status of workpiece: machined" and the structural features of the circular columnar workpiece with a spherical surface, namely, "protuberance/concavity of analysis object area: protruding relative to the surroundings", "surface segments: 3D spherical surface×1", and "relationship between surface segments: unknown (-)". For example, the analysis item setting unit 11e lists "surface roughness", "center of spherical surface", "diameter of sphere", etc., as items (candidate analysis items) that can be selected as the analysis item.

Furthermore, the analysis item setting unit 11e accesses the analysis history DB 16c to refer to, for example, frequencies with which analysis items have actually been analyzed in relation to workpieces similar to the current analysis object, i.e., the circular column workpiece with the spherical surface, and thereby ranks the listed candidate analysis items. Specifically, the analysis item setting unit 11e searches the analysis history DB 16c using the following queries: "machining status of workpiece: machined", "protuberance/concavity of analysis object area: protruding relative to the surroundings", "surface segments: 3D spherical surface×1", and "relationship between surface segments: unknown (-)". For example, in a case where the past analysis history of the analysis objects similar to the circular columnar workpiece with the spherical surface as the current analysis object shows that analysis of "surface roughness" constitutes 50%, analysis of "center of spherical surface"

constitutes 25%, and analysis of "diameter of sphere" constitutes 25%, the analysis item setting unit 11e sorts the candidate analysis items in descending order of likelihood of being selected, as follows: "surface roughness", "center of spherical surface", and "diameter of sphere".

Figure 21:
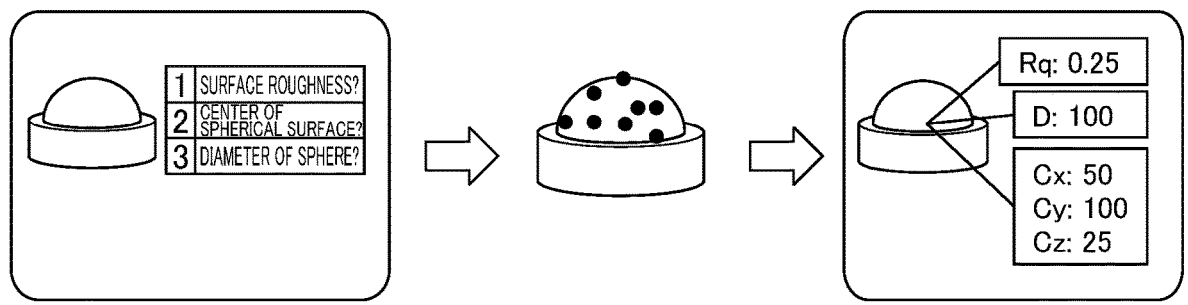
FIG. 21 is a schematic diagram illustrating an example of physical quantity calculation processing that is performed with respect to a circular columnar workpiece with a spherical surface.

As illustrated in FIG. 21, the UI display control unit 11a displays, on the UI screen, the candidate analysis items sorted by the analysis item setting unit 11e in rank order. Selection by the user is then accepted.

All the candidate analysis items may be automatically set as the analysis items. In this case, it is preferable to adapt a preset configuration to set all the candidate analysis items as the analysis items.

For example, in the case where all the candidate analysis items are set as the analysis items, the physical quantity calculating unit 11f extracts the table coordinate values of the extracted point group (pixels transformed to table coordinates) in the analysis object area in order to calculate the surface roughness, etc. of the hemisphere surface. The physical quantity calculating unit 11f calculates parameters of the spherical surface (center and diameter of the sphere) based on the table coordinate values of the extracted point group, using a known method such as the least-squares method. At this time, the physical quantity calculating unit 11f further calculates, for example, the square root of a squared error (RMS or Rq) as "surface roughness". As illustrated in FIG. 21, the UI display control unit 11a may display, on the UI screen, the Rq (surface roughness), the center of the spherical surface, and the diameter of the sphere calculated by the physical quantity calculating unit 11f.

The parameters of the spherical surface (the center and diameter of the sphere) may be calculated when the feature extracting unit 11d transforms the image coordinate values of the pixels extracted by the feature extracting unit 11d to the table coordinate system. The parameters of the spherical surface (the center and diameter of the sphere) may be calculated using information regarding CAD data.

Although the above embodiment describes the circular column workpiece with the spherical surface, the shape of the workpiece is not limited to this. For example, a workpiece having a free-form surface may be analyzed. In this case, after extracting a point group through the same steps as for the workpiece with the spherical surface, physical quantities such as surface roughness can be calculated by way of, for example, a comparison with information regarding CAD data.

<Image Analysis Processing Performed by Workpiece Image Analyzing Device 1>

Next, the flow of processing performed by the workpiece image analyzing device 1 will be described with reference to FIG. 22.

FIG. 22 is a flowchart for explaining the image analysis processing performed by the workpiece image analyzing device 1.

The image analysis processing is started in response to input of an instruction to start the image analysis processing via the input unit 14.

In Step S1, the UI display control unit 11a displays a user interface screen (UI screen) for the user to input and output various pieces of information during the image analysis processing.

In Step S2, the image acquisition unit 11b acquires image data including the three-dimensional shape of a workpiece, such as image data of the workpiece captured by the visual sensor 18 (e.g., a depth camera or a stereo camera) or CAD data of the workpiece generated by a CAD (computer aided design) system. The image data of the workpiece acquired in this step is stored in the storage unit 16.

In Step S3, the UI display control unit 11a displays an input screen to designate an analysis object in the acquired image of the workpiece.

In Step S4, the analysis object designating unit 11c acquires the contents of a designating operation that the user inputs via the input screen for designation of the analysis object.

In Step S5, the feature extracting unit 11d determines, in the image of the workpiece, an analysis object area, which is a portion to be analyzed, according to the contents of the designating operation inputted by the user.

In Step S6, the feature extracting unit 11d extracts image features (contour) of the analysis object area determined above.

In Step S7, the feature extracting unit 11d transforms the extracted image features (contour) in the planar coordinate system of display (image coordinate system) to the real-world coordinate system (table coordinate system) of the table on which the workpiece is placed.

In Step S8, the feature extracting unit 11d performs detections of circles, straight lines, etc. with respect to the image features (contour) transformed to the real-world coordinate system, and thereby detects structural features of the analysis object.

In Step S9, the analysis item setting unit 11e refers to the past analysis history (the analysis history DB 16c in the storage unit 16) based on the detected structural features of the analysis object and lists candidate analysis items that can be selected as the analysis item.

In Step S10, the analysis item setting unit 11e ranks the listed candidate analysis items based on, for example, the past analysis history.

In Step S11, the UI display control unit 11a displays, on the UI screen, the candidate analysis items sorted by the analysis item setting unit 11e in rank order.

In Step S12, the UI display control unit 11a displays an input screen for accepting selection from the candidate analysis items and accepts selection by the user.

In Step S13, the physical quantity calculating unit 11f extracts a feature (contour) necessary for calculating the physical quantity of the selected analysis item, from the data of the analysis object area transformed to the table coordinate system.

In Step S14, the physical quantity calculating unit 11f calculates the physical quantity of the selected analysis item based on the extracted feature (contour).

In Step S15, the UI display control unit 11a displays, on the UI screen, the physical quantity calculated in Step S14.

Following Step S15, the image analysis processing ends.

As described above, the workpiece image analyzing device 1 according to the embodiment accepts an operation that a user performs on an image of a workpiece to designate an analysis object. The workpiece image analyzing device 1 determines an analysis object area in the image of the workpiece in response to the designation by the user, and extracts structural features of the analysis object to the real-world coordinate system. The workpiece image analyzing device 1 displays, on the UI screen, candidate analysis items set based on the extracted structural features of the analysis object, and calculates the physical quantity of an analysis item selected by the user.

Thus, the workpiece image analyzing device 1 eliminates, from setting of image analyses, the need for complicated procedures and expertise that have conventionally been necessary for calculation of a predetermined physical quantity of an analysis item. Furthermore, the workpiece image analyzing device 1 eliminates the need for measuring instruments such as a touch probe. As a result, a high-speed analysis can be achieved while using only the visual sensor 18. The workpiece image analyzing device 1 can reduce the workload required to measure a workpiece.

It should be noted that the workpiece image analyzing device 1 is not limited to the embodiment described above, but includes modifications, improvements, etc. that are made within the scope in which the object can be achieved.

Modification 1

In the embodiment described above, the workpiece image analyzing device 1 calculates the physical quantity of an analysis item selected by the user, based on one image captured by the visual sensor 18. However, the present invention is not limited to this configuration. For example, the workpiece image analyzing device 1 may move the visual sensor 18 relative to the workpiece to capture two or more images of the workpiece, and may generate one high-resolution image of the entire workpiece.

This configuration allows the workpiece image analyzing device 1 to acquire an image of the entire workpiece, even if the workpiece is too large to fit within the imaging range of one visual sensor.

Alternatively, two or more images may be captured by two or more visual sensors, instead of the relative movement of one visual sensor.

In this case, the designation of analysis object may be performed as follows in Step S4, for example. An analysis object is designated in each of the images, and the features extracted from the analysis object are integrated in Step S7.

Modification 1-2

For example, the embodiment described above may have a configuration in which the visual sensor 18 captures an image after making relative movement so that a resolution required for calculation of a physical quantity can be achieved, based on information regarding resolution setting of a numerical controller or a machine tool.

Here, a case is discussed in which a numerical controller is set to control a machine tool with a positioning resolution of 1 μm.

In this case, for example, if the analysis object and the analysis item designated by the user are a rectangular parallelepiped workpiece and "position of center of gravity", respectively, a physical quantity finally calculated by the physical quantity calculating unit requires a resolution of several μm or less in many cases, so that the physical quantity can be used for the machine tool.

Generally, in respect of image measurement using a visual sensor, a rough estimate of resolution of the visual sensor is expressed as a ratio of the number of pixels to the imaging range of the visual sensor. For example, if the imaging range of a visual sensor is 10 cm square and the number of pixels of a camera is 1000 (length)×1000 (width), a rough estimate of resolution is 100 μm.

The resolution of the visual sensor can be increased by, for example, narrowing the imaging range of the visual sensor by bringing the relative position of the visual sensor closer to that of the workpiece.

Accordingly, when resolution setting information of the numerical controller indicates an object resolution, an analysis object may be designated on an image of such a wide area that the entire workpiece is within the field of view, and then, before Step S6 of extracting features of the analysis object, the visual sensor may be moved relative to a location where the object resolution is achieved, and then, may capture another image of the workpiece there. If the object resolution cannot be achieved by any relative movement of the visual sensor, a warning message or the like may be displayed.

In this way, the resolution required for calculation of a physical quantity can be achieved.

Modification 2

For example, in the embodiment described above, the workpiece image analyzing device 1 allows the user to select an analysis item after accepting designation of an analysis object and acquiring structural features of the analysis object. However, the present invention is not limited to this configuration. For example, the workpiece image analyzing device 1 may allow the user to select an analysis item prior to accepting designation of an analysis object and acquiring structural features of the analysis object.

Such selection of an analysis item narrows a range of analysis objects, thereby enabling the workpiece image analyzing device 1 to more appropriately detect structural features to be analyzed.

Modification 3

For example, in the embodiment described above, the workpiece image analyzing device 1 ranks the candidate analysis items based on the analysis history DB 16c after listing the candidate analysis items. However, the present invention is not limited to this configuration. For example, the workpiece image analyzing device 1 may simply list all analysis items without ranking them.

Alternatively, the workpiece image analyzing device 1 may list analysis items based on the estimator that employs machine learning, as well as the analysis history DB 16c.

Modification 4

For example, in the embodiment described above, the visual sensor 18 is a depth camera or a 3D camera. However, the present invention is not limited to this configuration. For example, if the shape of a workpiece is known in advance and has a constant height, the visual sensor 18 may be a 2D camera. An example in which the visual sensor 18 is a 2D camera will be described below.

For example, in the case of the cylindrical workpiece illustrated in FIG. 13, the visual sensor 18 captures an image of the cylindrical workpiece from directly above. The image acquisition unit 11b acquires the image data of the cylindrical workpiece captured from directly above by the visual sensor 18, and the UI display control unit 11a displays the acquired image on the UI screen. The analysis object designating unit 11c acquires an enclosure line that the user inputs to designate an analysis object, as in FIG. 13. The feature extracting unit 11d then extracts, from the acquired enclosure line as the initial value, the contour line (indicated by the bold line) corresponding to the outer circumference of the cylinder, by the Snake method. Next, the feature extracting unit 11d defines, as an analysis object area, the contour line extracted by the Snake method and the inside of the contour line, and extracts all the image features (contour) in the analysis object area. As in the case of FIG. 14, the feature extracting unit 11d can extract the two contour lines of the cylindrical workpiece, namely, the outer contour line and the inner contour line, which are indicated by bold lines. The feature extracting unit 11d may narrow down the structural features of the analysis object by using additional information such as CAD data or a machining program. Alternatively, the user may designate a structural feature.

In order to accurately measure the cylindrical workpiece, which is distorted in the image and is at a different scale from that in the real-world, the feature extracting unit 11d transforms points on the extracted contour lines to the real-world coordinate system (table coordinate system) based on the distance between the visual sensor 18 and the cylindrical workpiece, which is calculated in advance by a focusing method, and the transformation formula for the image coordinate system and the table coordinate system. As in the case of FIG. 14, the feature extracting unit 11d then performs detection of circles, straight lines, etc. with respect to the contours transformed to the table coordinate system, and thereby can detect a structural feature in that the analysis object area is composed of two concentric circles.

Furthermore, the feature extracting unit 11d can detect a structural feature in that the analysis object area protrudes in the Z direction with respect to the surroundings (table), based on, for example, knowledge that the luminance value of the table acquired in advance is the same as the luminance value of the surroundings of the analysis object area, indicating that the area around the analysis object area is the table with height "0". Subsequent processing is the same as in the case where the visual sensor 18 is a depth camera or a 3D camera, and the description thereof is not repeated.

When the same workpieces are mass-produced, it is possible to employ the following procedure. Information used for the first workpiece, such as an analysis object area, features, steps of calculating a physical quantity, and relative movement of the camera and an image of the first workpiece are saved. For analyses of the second and subsequent workpieces, an amount of shift in position and an amount of shift in angle relative to the image of the first workpiece are calculated, and the calculated amounts are added to the coordinate values of the analysis object area and the features that have been calculated to analyze the first workpiece, so that the steps of calculating the physical quantity are modified. In this way, the user is allowed to omit the operation for designating the analysis object and the operation for selecting the analysis item for the second and subsequent workpieces, whereby the analysis operation may be completely automated.

Each of the functions of the workpiece image analyzing device 1 of the embodiment can be implemented by hardware, software, or a combination thereof. Here, the implementation by software means that a computer reads and executes a program for the implementation.

Each of the components included in the workpiece image analyzing device 1 can be implemented by hardware including an electronic circuit, etc., software, or a combination thereof.

The program can be stored in various types of non-transitory computer readable media and can be provided to a computer. The non-transitory computer readable media include various types of tangible storage media. Examples of the non-transitory computer readable media include a magnetic recording medium (e.g., a flexible disk, a magnetic tape, a hard disk drive), a magnetic-optical recording medium (e.g., a magnetic optical disk), a read only memory (CD-ROM), a CD-R, a CD-R/W, and a semiconductor memory (e.g., a mask ROM, a programmable ROM (PROM), an erasable PROM (EPROM), a flash ROM, and a RAM). The program may be provided to the computer by way of various types of transitory computer readable media. Examples of the transitory computer readable media include an electrical signal, an optical signal, and an electromagnetic wave. The transitory computer readable medium can provide a program to the computer through a wired communication line, such as a wire and an optical fiber, or through a wireless communication.

Steps of describing the program to be recorded on a recording medium include not only processes that are executed in time sequence according to the respective order, but also processes that are executed in parallel or individually and not necessarily in time sequence.

In other words, the workpiece image analyzing device, the workpiece image analyzing method, and the program of the present disclosure can be implemented in various embodiments having the following features.

(1) The workpiece image analyzing device 1 of the present disclosure includes: the display unit 15 that displays an image of a workpiece as a machining object of an industrial machine; the analysis object designating unit 11c that accepts designation of an analysis object, the designation being provided with respect to the image of the workpiece; the feature extracting unit 11d that extracts a structural feature of the analysis object designated by the analysis object designating unit 11c, in the real-world coordinate system; the analysis item setting unit 11e that accepts designation of an analysis item, the designation being provided with respect to the image of the workpiece; and the physical quantity calculating unit 11f that extracts, from the structural feature of the analysis object, a feature necessary for calculation of a physical quantity of the analysis item designated by the analysis item setting unit 11e, and calculates the physical quantity based on the extracted feature.

The workpiece image analyzing device 1 having this configuration makes it possible to reduce the workload required for measurement of a workpiece.

(2) In the workpiece image analyzing device 1 described in (1), the analysis item setting unit 11e may rank candidate analysis items for the structural feature of the analysis object, and may display the candidate analysis items in rank order.

Due to this feature, the workpiece image analyzing device 1 can reliably allow the user to designate a desired analysis item.

(3) In the workpiece image analyzing device 1 described in (1) or (2), the image of the workpiece may be at least one of a two-dimensional captured image of the workpiece, a three-dimensional captured image of the workpiece, or an image of CAD data of the workpiece.

Due to this feature, the workpiece image analyzing device 1 can accurately acquire the structural feature of the analysis object.

(4) The workpiece image analyzing method of the present disclosure includes: a displaying step of displaying an image of a workpiece as a machining object of an industrial machine; an analysis object designating step of accepting designation of an analysis object, the designation being provided with respect to the image of the workpiece; a feature extracting step of extracting a structural feature of the analysis object designated in the analysis object designating step, in a real-world coordinate system; an analysis item setting step of accepting designation of an analysis item, the designation being provided with respect to the image of the workpiece; and a physical quantity calculating step of extracting, from the structural feature of the analysis object, a feature necessary for calculation of a physical quantity of the analysis item designated in the analysis item setting step, and calculating the physical quantity based on the extracted feature.

This workpiece image analyzing method exerts the same effects as those of (1) above.

(5) A program of the present disclosure causes a computer to perform functions that include: a display control function including displaying an image of a workpiece as a machining object of an industrial machine; an analysis object designating function including accepting designation of an analysis object, the designation being provided with respect to the image of the workpiece; a feature extracting function including extracting a structural feature of the analysis object designated by the analysis object designating function, in a real-world coordinate system; an analysis item setting function including accepting designation of an analysis item, the designation being provided with respect to the image of the workpiece; and a physical quantity calculating function including extracting, from the structural feature of the analysis object, a feature necessary for calculation of a physical quantity of the analysis item designated by the analysis item setting function, and including calculating the physical quantity based on the extracted feature.

This program exerts the same effects as those of (1) above.

EXPLANATION OF REFERENCE NUMERALS

1: Workpiece image analyzing device
11: CPU
11a: UI display control unit
11b: Image acquiring unit
11c: Analysis object designating unit
11d: Feature extracting unit
11e: Analysis item setting unit
11f: Physical quantity calculating unit
12: ROM
13: RAM
14: Input unit
15: Display unit
16: Storage Unit
16a: Image database
16b: Analysis object feature database
16c: Analysis history database
17: Communication unit
18: Visual sensor

The invention claimed is:

1. A workpiece image analyzing device comprising:
a display unit that displays an image of a workpiece as a machining object of an industrial machine;
an analysis object designating unit that accepts designation of an analysis object, the designation being provided with respect to the image of the workpiece, the analysis object including any one of a line that at least indicates part of an outer shape of the workpiece, an inner region that includes at least part of a region of the workpiece, and at least one dot in the region of the workpiece;
a feature extracting unit that determines, in the image of the workpiece, the analysis object designated by the analysis object designating unit to thereby detect a structural feature of the analysis object, and extracts the detected structural feature of the analysis object designated by the analysis object designating unit, in a real-world coordinate system, based on a distance image of the workpiece and a transformation formula for an image coordinate system and a table coordinate system;
an analysis item setting unit that accepts designation of an analysis item, the designation being provided with respect to the detected structural feature of the analysis object; and
a physical quantity calculating unit that extracts, from the detected structural feature of the analysis object, a feature necessary for calculation of a physical quantity of the analysis item designated by the analysis item setting unit, and calculates the physical quantity based on the extracted feature.

2. The workpiece image analyzing device according to claim 1,
wherein the analysis item setting unit ranks candidate analysis items for the detected structural feature of the analysis object, and displays the candidate analysis items in rank order.

3. The workpiece image analyzing device according to claim 2,
wherein the image of the workpiece is at least one of a two-dimensional captured image of the workpiece, a three-dimensional captured image of the workpiece, or an image of CAD data of the workpiece.

4. The workpiece image analyzing device according to claim 1,
wherein the image of the workpiece is at least one of a two-dimensional captured image of the workpiece, a three-dimensional captured image of the workpiece, or an image of CAD data of the workpiece.

5. A workpiece image analyzing method comprising:
a displaying step including displaying an image of a workpiece as a machining object of an industrial machine;
an analysis object designating step including accepting designation of an analysis object, the designation being provided with respect to the image of the workpiece, the analysis object including any one of a line that at least indicates part of an outer shape of the workpiece, an inner region that includes at least part of a region of the workpiece, and at least one dot in the region of the workpiece;
a feature extracting step including determining, in the image of the workpiece, the analysis object designated in the analysis object designating step to thereby detect a structural feature of the analysis object, and extracting the detected structural feature of the analysis object designated in the analysis object designating step, in a real-world coordinate system, based on a distance image of the workpiece and a transformation formula for an image coordinate system and a table coordinate system;
an analysis item setting step including accepting designation of an analysis item, the designation being provided with respect to the detected structural feature of the analysis object; and
a physical quantity calculating step including extracting, from the detected structural feature of the analysis object, a feature necessary for calculation of a physical quantity of the analysis item designated in the analysis item setting step, and including calculating the physical quantity based on the extracted feature.

6. A non-transitory computer readable medium encoded with a program for causing a computer to perform functions that comprise:

a display control function including displaying an image of a workpiece as a machining object of an industrial machine;

an analysis object designating function including accepting designation of an analysis object, the designation being provided with respect to the image of the workpiece, the analysis object including any one of a line that at least indicates part of an outer shape of the workpiece, an inner region that includes at least part of a region of the workpiece, and at least one dot in the region of the workpiece;

a feature extracting function including determining, in the image of the workpiece, the analysis object designated by the analysis object designating function to thereby detect a structural feature of the analysis object, and extracting the detected structural feature of the analysis object designated by the analysis object designating function, in a real-world coordinate system, based on a distance image of the workpiece and a transformation formula for an image coordinate system and a table coordinate system;

an analysis item setting function including accepting designation of an analysis item, the designation being provided with respect to the detected structural feature of the analysis object; and a physical quantity calculating function including extracting, from the detected structural feature of the analysis object, a feature necessary for calculation of a physical quantity of the analysis item designated by the analysis item setting function, and including calculating the physical quantity based on the extracted feature.

* * * * *